(12) United States Patent
Park

(10) Patent No.: US 8,477,244 B2
(45) Date of Patent: Jul. 2, 2013

(54) BROADCASTING RECEPTION SYSTEM AND METHOD FOR SELECTING BROADCASTING CHANNEL USING THE SAME

(75) Inventor: Jin Park, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 21 days.

(21) Appl. No.: 13/147,642

(22) PCT Filed: Feb. 3, 2010

(86) PCT No.: PCT/KR2010/000661
§ 371 (c)(1),
(2), (4) Date: Aug. 3, 2011

(87) PCT Pub. No.: WO2010/090443
PCT Pub. Date: Aug. 12, 2010

(65) Prior Publication Data
US 2011/0292286 A1 Dec. 1, 2011

(30) Foreign Application Priority Data
Feb. 3, 2009 (KR) ........................ 10-2009-0008473

(51) Int. Cl.
*H04N 5/45* (2011.01)
(52) U.S. Cl.
USPC ........................................................ 348/569

(58) Field of Classification Search
USPC .... 348/569, 570, 567, 563–566, 725; 725/28, 725/38, 57, 56, 50
See application file for complete search history.

(56) References Cited

U.S. PATENT DOCUMENTS

| | | | |
|---|---|---|---|
| 6,978,471 B1 * | 12/2005 | Klopfenstein | 725/50 |
| 7,071,993 B2 * | 7/2006 | Kim | 348/465 |
| 7,962,940 B2 * | 6/2011 | Kwon | 725/57 |
| 2003/0122962 A1 * | 7/2003 | Kim | 348/468 |
| 2003/0148734 A1 * | 8/2003 | Kim | 455/66 |
| 2006/0277572 A1 * | 12/2006 | Kang | 725/38 |
| 2007/0130587 A1 * | 6/2007 | Seok | 725/56 |
| 2007/0180462 A1 * | 8/2007 | Shin et al. | 725/28 |
| 2010/0077425 A1 * | 3/2010 | Shin et al. | 725/28 |

FOREIGN PATENT DOCUMENTS

| | | |
|---|---|---|
| KR | 10-2005-0081286 A | 8/2005 |
| KR | 10-2005-0091466 A | 9/2005 |
| KR | 10-2007-0008931 A | 1/2007 |
| KR | 10-2008-0034608 A | 4/2008 |

* cited by examiner

*Primary Examiner* — Paulos M Natnael
(74) *Attorney, Agent, or Firm* — LRK Patent Law Firm

(57) ABSTRACT

A broadcasting system is provided, which includes an input unit including a character set button, and a broadcasting reception device. The broadcasting reception device includes a broadcasting information storing unit storing a PSIP, a broadcasting station title loading unit loading a broadcasting channel corresponding to a title information of a broadcasting station set by the character set buttons using the PSIP stored in the broadcasting information storing unit, and a broadcasting title data displaying unit displaying a broadcasting channel loading the broadcasting station title loading unit.

8 Claims, 3 Drawing Sheets

BROADCASTING RECEPTION SYSTEM AND METHOD FOR SELECTING BROADCASTING CHANNEL USING THE SAME

CROSS REFERENCE TO RELATED APPLICATION

This application is a National Stage of International Application No. PCT/KR2010/000661 filed Feb. 3, 2010, claiming priority based on Korean Patent Application No. 10-2009-0008473 filed Feb. 3, 2009, the content of which is incorporated herein by reference in its entirety.

TECHNICAL FIELD

The present invention relates to a reception system and method for selecting broadcasting channels using the same.

BACKGROUND ART

The method for selecting a channel in a broadcasting system is generally such that a user push number keys on a remote controller to directly select a broadcasting channel if the user remembers a channel number corresponding to the broadcasting channel. however, if the user cannot remember a desired broadcasting channel, the user should find the desired broadcasting channel through broadcasting channel change by pushing a channel skip button on the remote controller.

By the conventional method for selecting a channel in a broadcasting system, if a user fails to remember a number corresponding to the desired broadcasting channel, the user cannot rapidly find the desired broadcasting channel. The user must check all broadcasting channels of a broadcasting station by pushing the channel skip button on the remote controller.

DISCLOSURE OF INVENTION

Technical Problem

It is therefore an object of the present disclosure to provide a broadcasting reception system capable of rapidly finding a broadcasting channel desired by a user and a method for selecting broadcasting channel using the same because it is possible to find a broadcasting channel by selecting a broadcasting title.

Solution to Problem

In one general aspect of the present disclosure, there is provided a broadcasting system comprising: an input unit including a character set button; and a broadcasting reception device, wherein the broadcasting reception device includes a broadcasting information storing unit storing a PSIP(Program and system Information Protocol); a broadcasting station title loading unit loading a broadcasting channel corresponding to a title information of a broadcasting station set by the character set button using the PSIP stored in the broadcasting information storing unit; and a broadcasting title data displaying unit displaying a broadcasting channel loading the broadcasting station title loading unit.

In one general aspect of the present disclosure, there is provided a method for selecting a broadcasting channel comprising a step of storing a broadcasting station title inputted by an input unit; storing a PSIP provided from a broadcasting station; a step of loading a broadcasting channel corresponding to the stored broadcasting station title using the stored PSIP; and a step of displaying the loaded broadcasting channel on a monitor.

Advantageous Effects of Invention

The broadcasting system and the method for selecting broadcasting channels using the same according to the present invention can recognize broadcasting channels by a title of broadcasting station. Thus, users can rapidly and efficiently select broadcasting channels that they want to find although the users don't know the numbers of broadcasting channels.

BEST MODE FOR CARRYING OUT THE INVENTION

Figure 1:
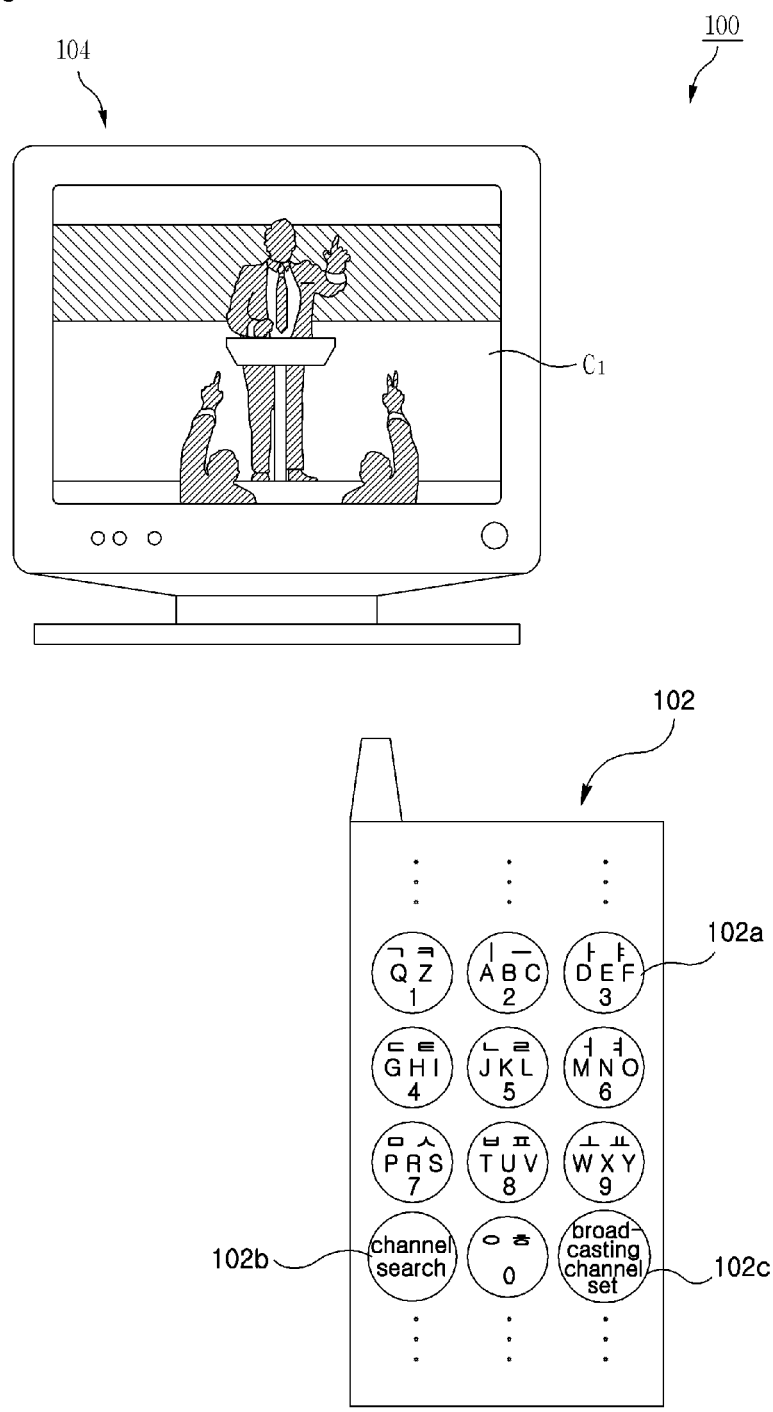
FIG. 1 represents an exemplary broadcasting system according to the present invention.
Figure 2:
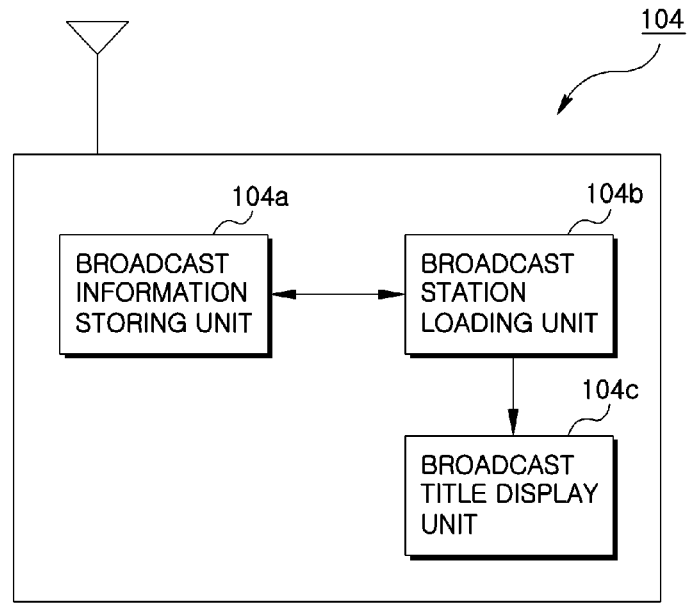
FIG. 2 is an exemplary block diagram representing an broadcasting reception device in FIG. 1.

FIG. 1 represents an exemplary broadcasting system according to the present invention and FIG. 2 is an exemplary block diagram illustrating a broadcasting reception device in FIG. 1.

As shown in FIG. 1, an broadcasting system 100 according to the present invention includes an input unit 102 and a broadcasting reception device 104.

The input unit 102 implements a wireless communication with the broadcasting reception device 104. The input unit 102 functions as a remote controller.

However, although it is not described, an exemplary input unit according to the present invention may be arranged on one surface of the broadcasting reception device 104 to implement a wire communication with the broadcasting reception device 104.

The input unit 102 includes a function button 102a, a channel searching button 102b, and a broadcasting channel set button 102c. The function button 102a includes number key buttons and character set buttons. The input unit 102 allows a user select a desired broadcasting channel through manipulating of the function button 102a, the channel searching button 102b, and the broadcasting channel set button 102c.

In some exemplary embodiments, the function button 102a may have a function that can input characters of various languages. That is, the languages may include Korean, Japanese, Chinese, English, French, German, Russian, etc.

As shown in FIG. 2, the broadcasting reception device 104 includes a broadcasting information storing unit 104a, a broadcasting station title loading unit 104b, and a broadcasting title data displaying unit 104c. The broadcasting information storing unit 104a receives a PSIP(Program and System Information Protocol) that corresponds to broadcasting channels provided by broadcasting stations. The Program and System Information Protocol is abbreviated to PSIP.

The PSIP may include broadcasting channel numbers, titles of broadcasting stations, broadcasting time, broadcasting contents, or broadcasting grades.

The broadcasting information storing unit 104a uses non-volatile memory for storing the PSIP.

The broadcasting station title loading unit 104b receives the title information of a broadcasting station set by pushing the character set buttons included in the function button 102a and then, request a broadcasting channel, e.g., C1, corresponding to the received title information from the broadcasting information storing unit 104a.

The broadcasting title displaying unit 104c is synchronized with the broadcasting station title loading unit 104b. That is, data loaded by the broadcasting station title loading unit 104b is transferred to the broadcasting title displaying unit 104c. The broadcasting title displaying unit 104c receives data loaded by the broadcasting station title loading unit 104b to control display of the broadcasting station title corresponding to the data on a displaying unit of the broadcasting reception device 104.

The broadcasting title displaying unit 104c may have a function that all broadcasting station titles relating to the character set buttons included in the function button 102a are displayed as a type of a list.

Figure 3:
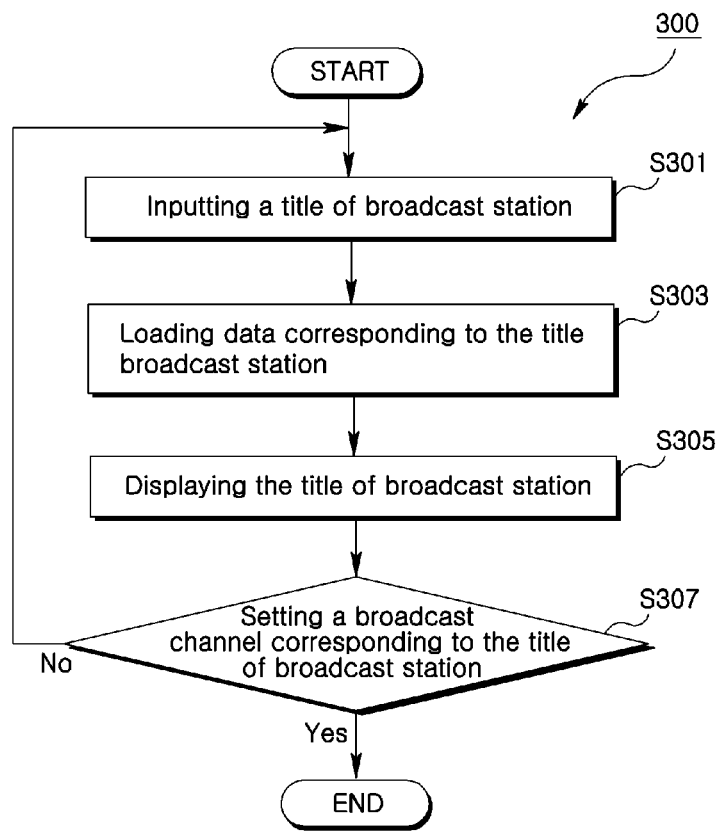
FIG. 3 is an exemplary flow chart of a broadcasting channel selection method using the broadcasting system according to the present invention.
Figure 4:
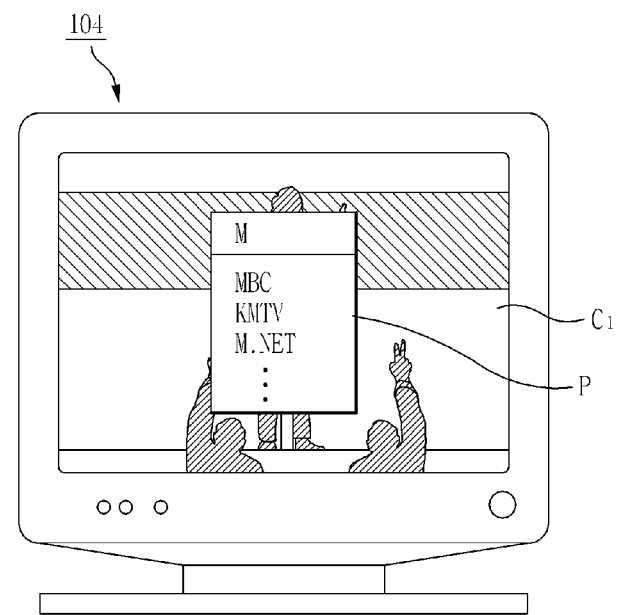
FIG. 4 is an exemplary picture illustrating inputting a title of a broadcasting station in a search window using a button set for a broadcasting station shown in FIG. 1.
Figure 5:
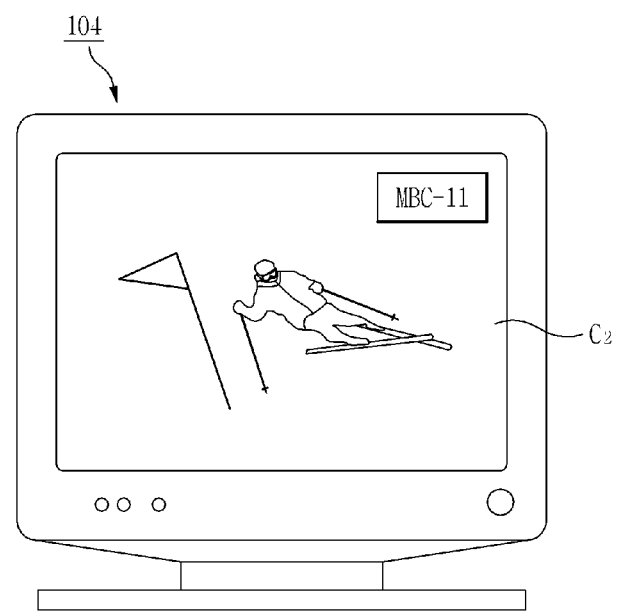
FIG. 5 is an exemplary picture illustrating a broadcasting channel that is changed by pushing a button set corresponding to the title of a broadcasting station on a search window of FIG. 5.

FIG. 3 is an exemplary flow chart of a broadcasting channel selection method using the broadcasting system according to the present invention. FIG. 4 is an exemplary picture illustrating inputting a title of a broadcasting station in a search window using a button set for a broadcasting station shown in FIG. 1. FIG. 5 is an exemplary picture illustrating a broadcasting channel changed by pushing the button set corresponding to the title of a broadcasting station on a search window of FIG. 5.

As shown, the method for selecting broadcasting channels 300 includes a step of inputting a title of broadcasting station S301, a step of loading data corresponding to the title of broadcasting station S303, a step of displaying the title of broadcasting station S305, and a step of setting a broadcasting channel corresponding to the title of broadcasting station S307.

At the step of inputting a title of broadcasting station S301, a user inputs a title of the broadcasting reception device 104 using a channel searching button 102b included in the input unit 102 and the character set buttons included in the function button 102a.

As shown in FIG. 4, if the channel searching button 102b is pushed, the search window P of the broadcasting reception device 104 is displayed on a broadcasting channel $C_1$. Then, title of broadcasting station is inputted in the search window of the broadcasting reception device 104 using the function button 102a.

In some exemplary embodiments, all titles of broadcasting stations regarding one or more character set by the channel searching button 102b may be displayed as a list type in the search window of the broadcasting reception device 104.

For example, if the character 'M' is inputted in the search window of the broadcasting reception device 104, titles of broadcasting stations such as MBC, KMTV, or M.NET are shown on the search window.

At the step of loading data corresponding to the title of broadcasting station S303, information for a title of broadcasting station is loaded through the broadcasting information storing unit 104a and the broadcasting station title loading unit 104b and a broadcasting channel $C_2$ regarding the title of broadcasting station from the broadcasting information storing unit 104a is loaded.

The step of displaying the title of broadcasting station S305, the broadcasting reception device 104 recognizes the loaded broadcasting station title by the broadcasting title displaying unit 104c and controls the display of the broadcasting channel regarding title of broadcasting station on the monitor of itself.

For example, as shown in FIG. 5, MBC broadcasting channel is displayed on the monitor of the broadcasting reception device 104 by the title of the broadcasting station 'MBC'.

At the step of setting a broadcasting channel corresponding to the title of broadcasting station S307, the broadcasting channel $C_2$ displaying through the broadcasting title displaying unit 104c of the broadcasting reception device 104 is set using the broadcasting channel set button 102c of the input unit 102.

As described above, the broadcasting system 100 and the method for selecting broadcasting channels using the same 300 according to the present invention can recognize broadcasting channels by a title of broadcasting station. Thus, users can rapidly and efficiently select a desired broadcasting channels although the users fails to know the numbers of broadcasting channels.

While the present invention has been described with respect to the specific embodiments, it will be apparent to those skilled in the art that various changes and modifications may be made without departing from the spirit and scope of the invention as defined in the following claims.

Industrial Applicability

The broadcasting system and the method for selecting broadcasting channels using the same according to the present invention can be adapted to broadcasting stations or manufacture of television sets.

The invention claimed is:

1. A broadcasting system, comprising:
   an input unit configured to transmit a user input and at least one character, the input unit comprising a character set button; and
   a broadcasting reception device,
   wherein the broadcasting reception device comprises:
   a storing unit configured to store a PSIP(Program and System Information Protocol) corresponding to a broadcasting channel provided by a broadcasting station, the PSIP comprising a title of the broadcasting station;
   a display unit configured to display a first broadcasting channel and a second broadcasting channel; and
   a loading unit configured to
      control the display unit to display a search window on the first broadcasting channel when the user input is received from the input unit,
      receive the at least one character from the input unit,
      control the display unit to display a list of titles of broadcasting stations including the at least one character in the search window, the titles of the broadcasting stations being selected from the PSIP, and
      control the display unit to display the second broadcasting channel on the display unit when a title of a broadcasting station corresponding to the second broadcasting channel is selected from the list by the input unit.

2. The broadcasting system of claim 1, wherein the storing unit includes a nonvolatile memory.

3. The broadcasting system of claim 1, wherein the input unit includes a remote controller or is provided on one side of the broadcasting reception device.

4. The broadcasting system of claim 1, wherein the character set button includes a plurality of buttons capable of inputting a plurality of languages.

5. The broadcasting system of claim 1, wherein the PSIP further comprises at least one of broadcasting channel numbers, broadcasting time, broadcasting contents, and broadcasting grades.

6. A method for selecting a broadcasting channel, comprising:
- storing a PSIP corresponding to a broadcasting channel provided by broadcasting stations, the PSIP comprising titles of the broadcasting stations;
- displaying a first broadcasting channel on a display unit;
- displaying a search window on the first broadcasting channel when a user input is received from a input unit;
- receiving at least one character from the input unit;
- displaying a list of titles of broadcasting stations including the at least one character in the search window, the titles of the broadcasting stations being selected from the PSIP;
- displaying a second broadcasting channel on the display unit when a title of a broadcasting station corresponding to the second broadcasting channel is selected from the list by the input unit.

7. The method of claim 6, wherein the stored broadcasting station title is a Korean language or a predetermined foreign language.

8. The method of claim 6, wherein the PSIP further comprises at least one of broadcasting channel numbers, broadcasting time, broadcasting contents, and broadcasting grades.

* * * * *